(12) United States Patent
Blossfeld (10) Patent No.: US 7,369,960 B2
(45) Date of Patent: May 6, 2008

(54) DEVICE AND METHOD FOR DETECTING AN ANGULAR POSITION OF A ROTATING OBJECT (75) Inventor: Lothar Blossfeld, Breitnau (DE)

(73) Assignee: Micronas GmbH, Freiburg (DE)

( * ) Notice: Subject to any disclaimer, the term of this patent is extended or adjusted under 35 U.S.C. 154(b) by 307 days.

(21) Appl. No.: 10/703,113

(22) Filed: Nov. 6, 2003

(65) Prior Publication Data

US 2005/0024006 A1    Feb. 3, 2005

(30) Foreign Application Priority Data

Nov. 6, 2002 (DE) ................................ 102 52 031

(51) Int. Cl.
*G01C 9/00* (2006.01)
*G01C 17/00* (2006.01)
*G01C 19/00* (2006.01)

(52) U.S. Cl. .................... 702/151; 702/94; 702/95; 702/150; 702/154; 700/302

(58) Field of Classification Search ................ 702/100, 702/150–154, 94–95
See application file for complete search history.

(56) References Cited

U.S. PATENT DOCUMENTS

| 3,801,830 | A |   | 4/1974  | Boyer ........................ 307/235 |
| 4,764,685 | A |   | 8/1988  | Bleckmann et al. ......... 307/106 |
| 4,835,467 | A |   | 5/1989  | Gokhale .................... 324/166 |
| 5,101,155 | A |   | 3/1992  | Oehler et al. .............. 324/166 |
| 5,103,171 | A |   | 4/1992  | Petersen .................... 324/207 |
| 5,239,177 | A | * | 8/1993  | Cunniff .................. 250/231.18 |
| 5,446,375 | A |   | 8/1995  | Perkins ...................... 324/163 |
| 5,459,398 | A |   | 10/1995 | Hansen et al. ............. 324/166 |
| 5,497,084 | A |   | 3/1996  | Bicking ..................... 324/207 |
| 5,554,948 | A |   | 9/1996  | Hansen et al. ............. 327/181 |
| 5,574,364 | A |   | 11/1996 | Kajimoto et al. .......... 324/207 |

(Continued)

FOREIGN PATENT DOCUMENTS

AT    389 166    6/1982

(Continued)

OTHER PUBLICATIONS

Deboo/Burrous, Integrated Circuits and Semiconductor Devices: Theory and Application, 1977, McGraw-Hill, Inc., Second Edition, 175-192.*

*Primary Examiner*—John Barlow
*Assistant Examiner*—Sujoy Kundu
(74) *Attorney, Agent, or Firm*—O'Shea, Getz & Kosakowski, P.C.

(57) ABSTRACT

In detecting the time at which a rotating object passes a given angular position, a value range of an angular position sensor output signal which varies relatively rapidly with angular position acts as a trip threshold that, when exceeded, indicates the object has achieved the detected angular position. A relatively rapid change as a function of angular position is determined by reference to the functional dependence of the detection signal level on the angular position of the object. Assuming the sensor signal varies sinusoidally with the object's angular position, the ranges in which the level of the sensor output signal varies rapidly with angular position lie in the vicinity of the angular positions at which the sensor output signal crosses its own mean value, the threshold value being chosen near this mean value.

25 Claims, 5 Drawing Sheets

U.S. PATENT DOCUMENTS

| | | | |
|---|---|---|---|
| 5,650,719 A | 7/1997 | Moody et al. | 324/166 |
| 5,917,320 A | 6/1999 | Scheller et al. | 324/166 |
| 6,147,474 A * | 11/2000 | Koss et al. | 322/59 |
| 6,147,486 A | 11/2000 | Koss et al. | 324/166 |
| 6,215,297 B1 | 4/2001 | Bleckmann et al. | 324/166 |

FOREIGN PATENT DOCUMENTS

| | | |
|---|---|---|
| CH | 559 367 | 2/1975 |
| DE | 3234383 | 3/1984 |
| DE | 4435678 | 4/1995 |
| DE | 10041736 | 2/2002 |
| EP | 0 155 368 B1 * | 11/1984 |
| EP | 0155368 | 11/1984 |
| EP | 0590190 | 4/1994 |
| EP | 611952 A1 * | 8/1994 |
| EP | 0615111 | 9/1994 |

* cited by examiner

DEVICE AND METHOD FOR DETECTING AN ANGULAR POSITION OF A ROTATING OBJECT

BACKGROUND OF THE INVENTION

This invention relates in general to a device and a method for detecting an angular position of a rotating object, and in particular to a device and method for detecting the time at which the rotating object passes a given angular position.

Motor vehicle engines often use sensors to detect the angular position of a crankshaft or a valve position, for example, to control the combustion in a cylinder of the motor vehicle engine with reference to the detected position. The pollutant content in the exhaust gases that result from the combustion process depends on the time of ignition. Accurately detecting the crankshaft or valve position allows the combustion process to occur relatively more efficiently, resulting in less pollutants.

Numerous devices are known that can be used for detecting an angular position. There are generally two types of detection errors that occur in such a device for detecting angular position. These include constant angular errors associated with inaccuracies in the positioning of such a device in the vicinity of the object whose angular position is to be detected, or in the positioning of the components of the device relative to one another. The second type of error are those that vary with time, and may, for example, be caused stochastically, as a function of speed of rotation, or thermally. These errors are the result of a number of different causes. Present-day angular position detection devices include inductive magnetic sensors or Hall sensors that interact with magnets attached to the object to be detected. These sensors produce a sensor output signal that changes constantly with the position of the magnet to be detected. The amplitude of the output signal depends to a relatively strong degree on the distance between the object to be detected and the sensor. Changes in the speed of rotation of the object change both the frequency and the shape of the sensor output signal, so that in general no unequivocal conclusion can be drawn about a definite angular position from the level of the sensor output signal.

Two techniques are known for correcting this problem. The first depends on the use of an automatically regulated amplifier to which the sensor output signal is fed and that produces from this a signal with a fixed amplitude. From this it is then assumed that a certain value of the amplifier-controlled signal always corresponds to the same angular position of the object to be detected. This method has the drawback that the regulation reacts to disturbances or eccentricity of the emitter wheel and introduces additional measurement errors in such situations.

The second known technique depends on detecting each signal peak of the sensor output signal, and determining from them the angular position of the object to be detected. It is assumed that the sensor output signal always reaches its maximum level—even when this value fluctuates—at the same angular position of the object to be detected. The problem arises that the output signals of the known inductive magnetic sensors or Hall sensors are primarily sinusoidal and consequently have very flat signal peaks, which are relatively sensitive to noise and interference.

What is needed is a device and a method for detecting an angular position of a rotating object that make possible relatively precise angular detection without automatic amplification control and without detecting the peaks of the sensor output signal, thereby avoiding the problems of the aforementioned two techniques.

SUMMARY OF THE INVENTION

Briefly, according to an aspect of the invention, a value range of an angular position sensor output signal which varies relatively rapidly with angular position is chosen for a trip threshold. When the threshold is exceeded, the object has achieved the angular position to be detected. A relatively rapid change as a function of angular position can be determined by reference to the functional dependence of the detection signal level on the angular position of the object to be detected. Thus, for example, a value range with a relatively rapid change of level can be defined as a value range that corresponds to angular positions at which the derivative of the sensor output signal with respect to angular position amounts to at least 10, 20, 30 or 50% of the maximum value of this derivative. For example, assuming that the sensor signal varies sinusoidally with the angular position of the object to be detected, which is true for a number of practical situations, then the ranges in which the level of the sensor output signal varies rapidly with angular position in each case lie in the vicinity of the angular positions at which the sensor output signal crosses its own mean value. Therefore, it is desirable to choose the threshold value in the vicinity of this mean value.

Since the mean value of the sensor output signal for a given type of sensor can vary depending on the environment in which it is used, a device according to an aspect of the invention is provided with an averaging circuit in which an input receives the sensor output signal and an output produces a signal representative of the trip threshold. Such an averaging circuit makes the device independent of shifts in the mean value of the sensor output signal caused, for example, by component positioning or by drifting.

Since the sensor output signal varies with the angular position of the object, each level of the sensor output signal that is not an extreme high or low signal value corresponds to two different angular positions of the object. To differentiate these two positions from one another and to detect only one of them selectively, the trip threshold is preferably defined by a first reference level, and an evaluation circuit produces the detection signal when the level of the sensor output signal crosses this first reference level from above, but not when the level of the sensor output signal crosses the first reference level from below. A second reference level can be defined similarly in which the evaluation circuit produces the detection signal when the level of the sensor output signal crosses the second reference level from below, and does not produce the detection signal when the level of the sensor output signal crosses the second reference level from above.

It is preferred for the two reference levels to be defined simultaneously in the device according to the invention, since this permits a hysteresis to be generated in a simple manner that suppresses faulty multiple detections of the angular position of the object derived from signal noise during a rotation of the object. The evaluation circuit that produces the detection signal preferably comprises a comparator with two inputs that receives the sensor output signal at a first input and produces the detection signal at its output when the levels of the signals at its two inputs cross one another, and a selection circuit for the optional input of the first or second reference level at the second input of the comparator.

In a first version, the two reference levels are chosen in each case on the two sides, respectively, of a mean value of the sensor output signal. Knowing the functional relationship between the angular position of the object and the sensor output signal, the spacing of each of the two reference levels from the mean value can be chosen so that they correspond to two angular positions of the object with the same spacing from the angular position at which the sensor output signal crosses the mean value. In the case of a sinusoidal relationship between the angular position and the sensor output signal, for this purpose each of the two reference levels has the same spacing above and below the mean value, respectively.

In another version, the two reference levels are variable between a central level and each of two levels separated from the central level upward and downward, respectively. The first reference level is at the central level when the sensor output signal crosses the first reference level from above and the second reference level is at the central level when the sensor output signal crosses the second reference level from below. This way in each case the passage of the sensor output signal through the central level is detected and a hysteresis is realized.

There are different possibilities for providing that each of the two reference levels is at the central level at the proper time. One is a phase-shifting circuit or a differentiation circuit (with there being no difference between the two in the case of a sinusoidal relationship between the angular position and the sensor output signal) for differentiating the change in the reference levels from the sensor output signal. The differentiated sensor output signal obtained with such a circuit may be utilized to make either the first or the second reference level the same as the central level, depending on its algebraic sign.

Alternatively, the evaluation circuit may comprise at least a second comparator and a switch controlled by the comparator, with the sensor output signal being fed to one input of the comparator and with the one of the two reference levels that is not fed to the first comparator at the same time being fed to the other input of the comparator. The second comparator trips the switch over when the levels of the two input signals of the second comparator cross one another.

The device is preferably also provided with an amplitude detection circuit for detecting the amplitude of the sensor output signal. Such an amplitude detection circuit can be used in particular to derive from it the two reference levels, or if the reference levels are variable, to derive their level separated from the central level.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
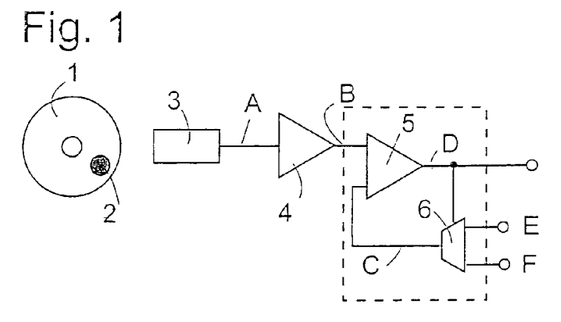
FIG. 1 is a block diagram illustration of a first embodiment of an angular position sensing device.
Figure 2:
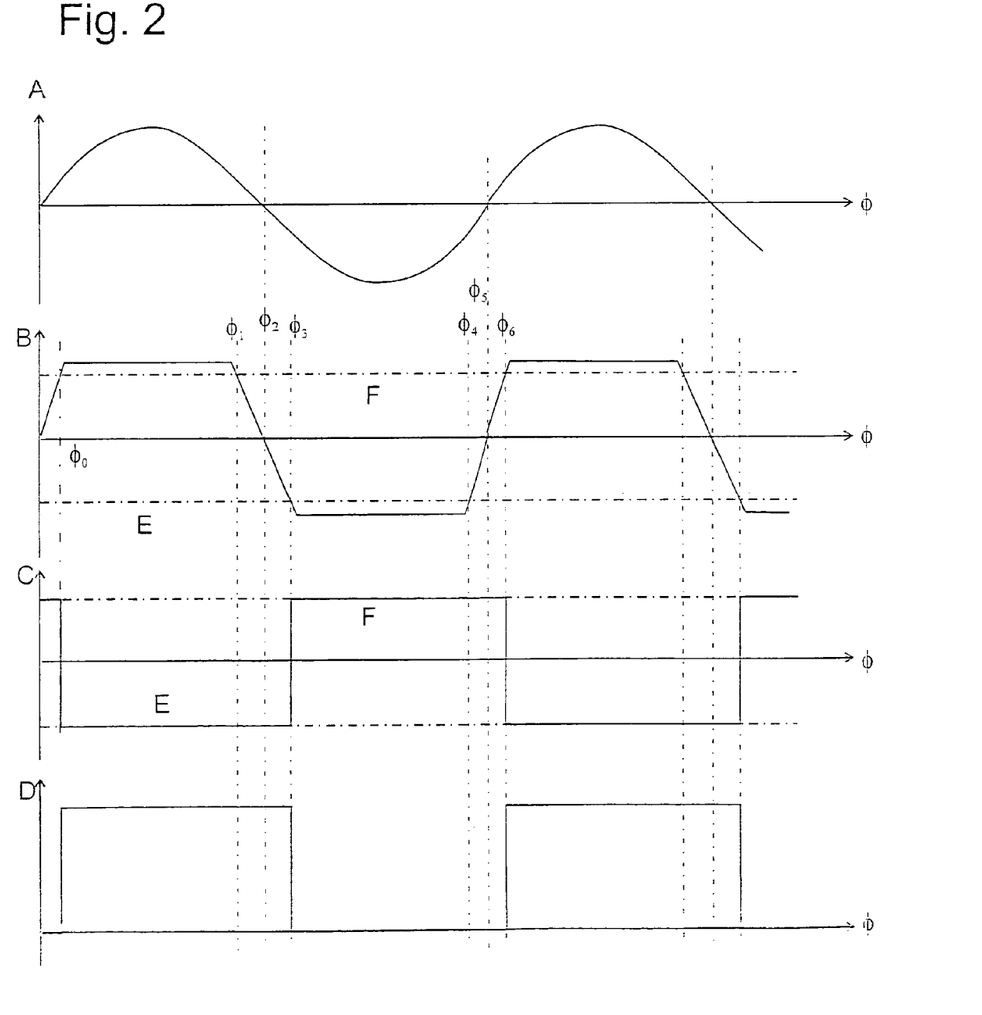
FIG. 2 is a graph of various signals as a function of angular position at various locations in the sensing device illustrated in FIG. 1.

In FIG. 1 a rotating object 1 may comprise an emitter wheel of a crankshaft of an internal combustion engine. The emitter wheel 1 carries a magnet 2. A detection device comprises a magnetic field sensor 3, for example, an inductive sensor or a Hall sensor, which produces a sensor output signal A. The sensor output signal A is illustrated in FIG. 2 as a function of the angle of rotation $\phi$ of the emitter wheel and has a curve similar to a sine function, with each period of the sine function corresponding to one rotation of the object.

An amplifier 4 is connected to the output of the magnetic field sensor 3 and produces an amplified sensor output signal B. As illustrated in FIG. 2, the amplifier 4 can go to saturation at relatively large amplitudes of the sensor output signal A. This is useful since a signal with relatively steep, readily detected zero passages for further processing is obtained, but it is not necessary for the applicability of the invention.

The amplified sensor output signal B is fed to a first input of a comparator 5. A reference level is applied to the second input of the comparator 5, the reference level being selected by a switch 6 from two reference levels E and F applied to inputs of the switch 6. Each of the reference levels E, F (E being a logical low or zero, F being a logical high or one) is chosen so that it intersects the curve of the amplified sensor output signal B at angular positions $\phi_1$ or $\phi_3$, respectively, which are at the same angular spacing before or after a zero passage $\phi_2$. At the time origin in FIG. 2, which is chosen arbitrarily so that the signal B has the value of zero there, the reference level C at the output of the switch 6 has the logical high value F. The comparator 5 produces the output signal D at the logical level of zero. When the value of the signal B crosses the level F from below at an angle of rotation $\phi_0$, the output signal D of the comparator 5 trips from zero to one, and thus indicates that the emitter wheel is in the position of rotation $\phi_0$. At the same time, the switch 6 is switched over by the change of the output signal D, so that the low reference level E is then applied to the second input of the comparator 5. At first this changes nothing at the output signal D of the comparator. The output signal D of the comparator 5 reverts to zero only at the rotational position $\phi_3$ when the signal B drops below the low reference level E. At this time, the switch 6 is again switched over, and the reference level F is again applied to the second input of the comparator. When the signal B again exceeds the level F, the device completes one operating cycle. Since the device according to the invention responds to relatively rapid changes of the sensor output signal A, relatively exact determination of the time at which the emitter wheel is in the position $\phi_0$ (or $\phi_3$) is possible.

Figure 3:
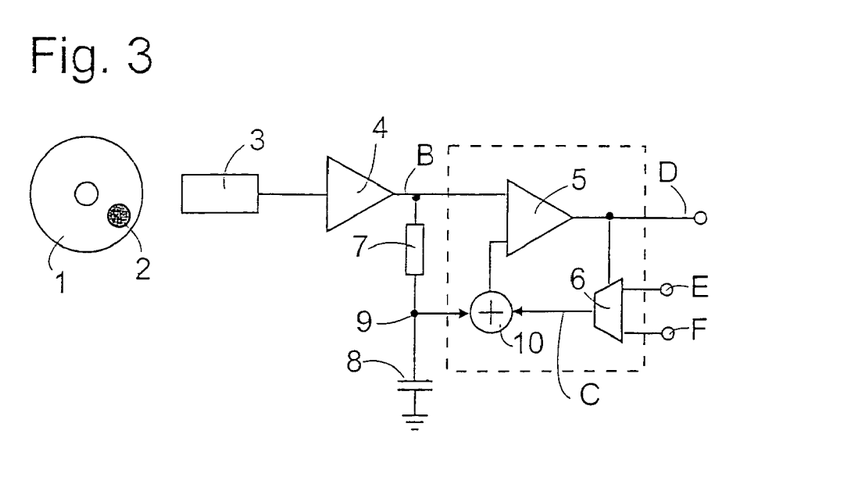
FIG. 3 is a block diagram illustration of a second embodiment of an angular position sensing device.

FIG. 3 illustrates a refinement of the device of FIG. 1. An averaging circuit is connected to the output of the amplifier 4, in this case in the form of an RC network including a resistor 7 and a capacitor 8 that connect the output of the amplifier 4 in series to ground. The potential that is reached during the operation of the circuit at a center point 9 between the resistor 7 and the capacitor 8, with suitable choice of the time constant of the RC network, corresponds to the mean voltage of the amplified sensor output signal B. This center point 9 is connected to a first input of an adder 10 whose second input is connected to the output of the switch 6 and whose output is connected to the second input of the comparator 5. The adder 10 thus superimposes the mean voltage of the amplified sensor output signal B on each reference level switched through by the switch 6, and thus makes the switching insensitive to drifting of the sensor 3, of the amplifier 4, or any imbalance of the emitter wheel 1 that would lead to a mean value of the sensor output signal A differing from zero. This ensures that despite any such drifting, the output signal D of the comparator 5 changes at the same angular position of the emitter wheel 1.

Figure 4:
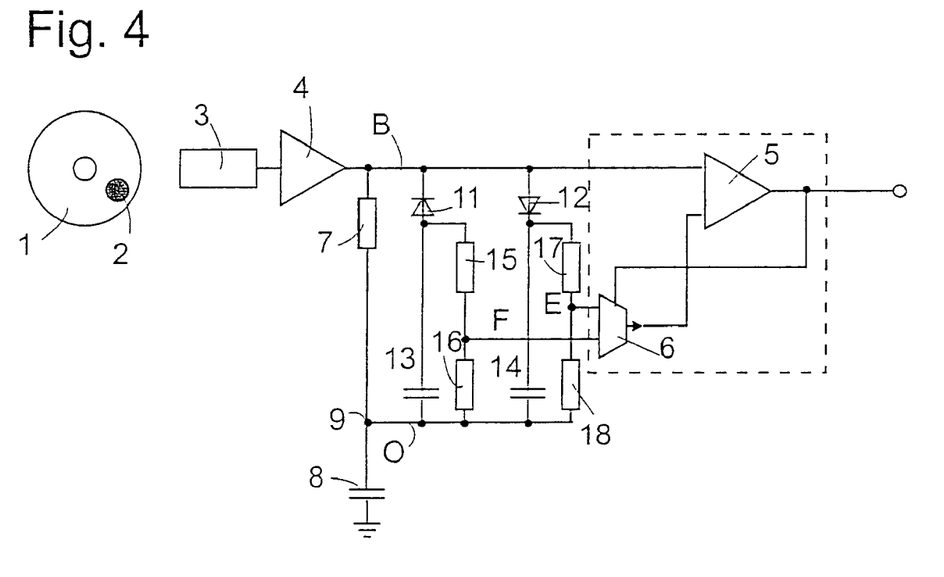
FIG. 4 is a block diagram illustration of a third embodiment of an angular position sensing device.

A further refinement of the device of FIG. 1 is illustrated in FIG. 4. This configuration differs from those of FIGS. 1 and 3 in that the reference levels E, F in this case are derived from the sensor output signal A. For this purpose, the device is equipped with an amplitude detection circuit for the (saturated or unsaturated) amplified sensor output signal B. The amplitude detection circuit includes two series circuits, each including a diode 11, 12, and a capacitor 13, 14, which are connected on the one side to the output of the amplifier 4 and on the other side to the center point 9 of the RC network 7, 8. The two diodes 11, 12 are connected antiparallel, so that the capacitor 13 is charged through the diode 11 as long as the signal B has a potential below the average potential O at the center point 9, and the capacitor 14 is charged through the diode 12 when the level of the signal B is above the potential O of the center point 9. Two voltage dividers that include resistors 15, 16, and 17, 18, respectively, are each connected in parallel to the capacitors 13 and 14, respectively. The two voltage dividers divide the voltages applied through the capacitors 13, 14 in equal parts and feed them to the switch 6 as the reference levels E and F. The circuit provides that each of the reference levels E, F is in a fixed ratio, set by the division ratio of the voltage dividers 15-18, to the amplitude of the amplified sensor output signal B. Thus, even with fluctuating amplitude of the sensor output signal it is ensured that the device responds at the same angular positions $\phi_0$ (or $\phi_3$) of the emitter wheel 1.

In the devices of FIGS. 1, 3 and 4 the necessity of implementing a hysteresis compels the choice of different reference levels for the switching of the output signal D to zero or to one. It would be desirable to choose these reference levels as close as possible to the average value O of the amplified sensor output signal B, since the closer they are to the average value O, the smaller the detection errors are that can arise with fluctuating speeds of rotation of the emitter wheel 1 from the dependence of the amplitude of the sensor output signal A on this speed of rotation. However, the smaller the difference between the two reference levels, the greater is the risk that a noise component in the sensor output signal A will lead to detection errors to which the device responds relatively too soon or too late.

Figure 5:
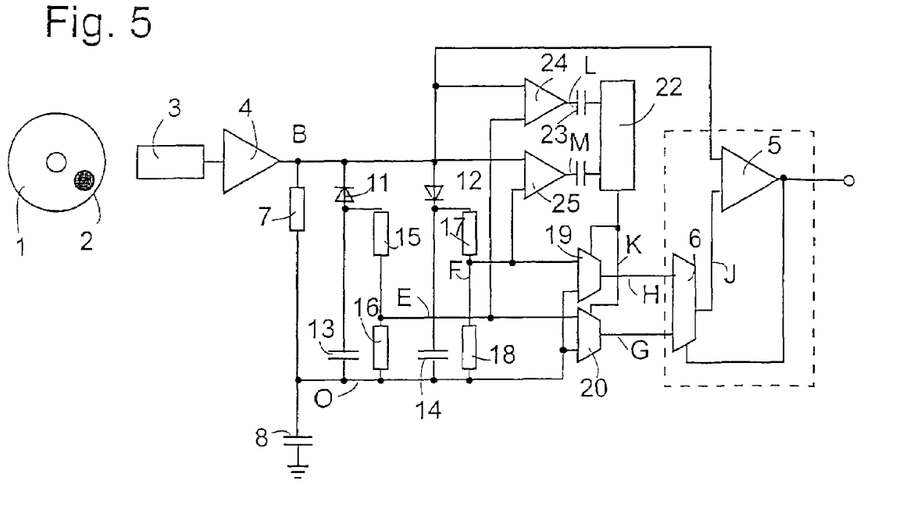
FIG. 5 is a block diagram illustration of a fourth embodiment of an angular position sensing device.

FIG. 5 illustrates a refinement of the detection device according to the invention that permits it to reconcile these requirements that are contradictory, and to detect relatively exactly the angular position at which the sensor output signal A crosses its mean value, and to realize a hysteresis. With this configuration, the reference potentials H, G fed to the switch 6 are not constant or constant except for the drifting already mentioned. Instead, they are switched over during each rotation of the emitter wheel 1 between the mean potential O of the amplified sensor output signal B obtained through the RC network 7, 8, and the potential E, F delivered by the amplitude detection circuit 11-18, each differing from the mean potential O by the same amount upward or downward, respectively. The switching occurs with the assistance of two switches 19, 20, which in turn are controlled by the output signal K of an RS-flip flop 22. Setting and resetting inputs of the RS-flip flop 22 are each connected through a corresponding capacitor 23 to the outputs of comparators 24, 25. The inputs of the comparator 24 are connected to the amplified sensor output signal B and the reference level E, while the inputs of the comparator 25 are connected to the amplified sensor output signal B and the reference level F.

Figure 6:
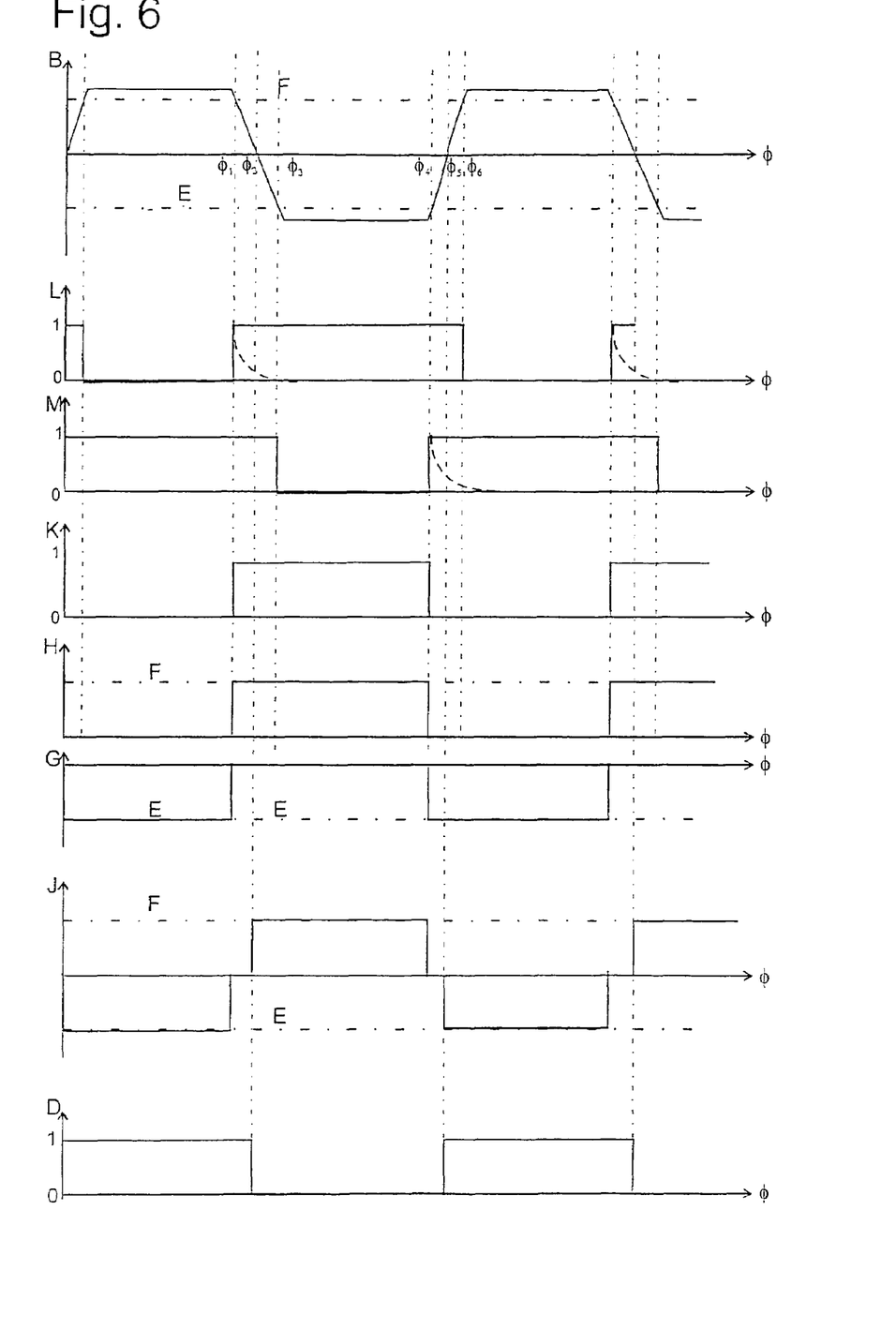
FIG. 6 is a graph of various signals as a function of angular position at various locations in the sensing device illustrated in FIG. 5.

The graphs of FIG. 6 illustrate in more detail the method of operation of the device of FIG. 5. The signal B is assumed to be identical with that of FIG. 2; the direct output signal A of the magnetic field sensor 3 is not illustrated in FIG. 6. The two comparators 24, 25, each derive a logic signal L or M, respectively, from the signal B. The signal L has the value one when the signal B is below the level F; otherwise the value is zero. The signal M has the value one when the signal B is above the level E; otherwise the value is zero. The capacitors 23 each allow passage of a pulse on a rising flank of the signals L, M to the RS-flip flop 22, to set or reset the flip flop 22. These pulses are illustrated as broken lines in the graphs of the signals L, M in FIG. 6. Negative pulses, which correspond to the falling flanks of the signals L, M, have no effect on the RS-flip flop 22 and are not shown in FIG. 6; they can also be diverted to ground through diodes (not shown).

As seen from the curve of the output signal K of the flip flop 22, the flip flop 22 is set in each case by a rising flank of the signal L at the angular position $\phi_1$ and is reset by a rising flank of the signal M at the angular position $\phi_4$. The flip flop 22 thus flips the switches 19, 20 in each case just prior to a zero passage ($\phi_2$ or $\phi_5$) of the signal B. More specifically the flip flop 22 switches over the output signal G of the switch 20 from the level E to zero and the output signal H of the switch 19 from the level zero to F just prior to a falling zero passage (at $\phi_2$) of the signal B.

At the origin of the graphs, where $\phi=0$, the switch 6 passes the signal G to the comparator 5 as signal J. Consequently, up to the angle $\phi_1$ the signal J has the level E and is thus lower than signal B, and the output signal D of the comparator 54 is constantly a logical one. When the signal G is at zero at the angle $\phi_1$, the signal J does the same but the magnitude ratios of the input signals of the comparator 5 are not thereby changed, so that the output signal D of the comparator 5 retains the logical level one. Only when the signal B passes through zero at $\phi_2$ do the magnitude ratios change, and the output signal D then goes to zero. This leads to the flipping of the switch 6, which then switches the signal H through to the comparator 5. The rise of the level of the signal J to F associated with this does not change the output signal D, which remains zero, but a hysteresis is reached to the effect that a disturbance of the signal B must have at least the amplitude F to lead to another flipping of the output signal D.

When the signal B again rises above the level E at the angle $\phi_4$, the flip flop 22 is reset, the signal G goes from zero to E, and the signals H, J go from F to zero. Thus the trip threshold of the comparator at the proper time prior to the zero passage of the signal B at $\phi_3$ again lies at zero, and the position $\phi_5$ is correctly detected and is manifested as a rising flank of the output signal D.

Figure 7:
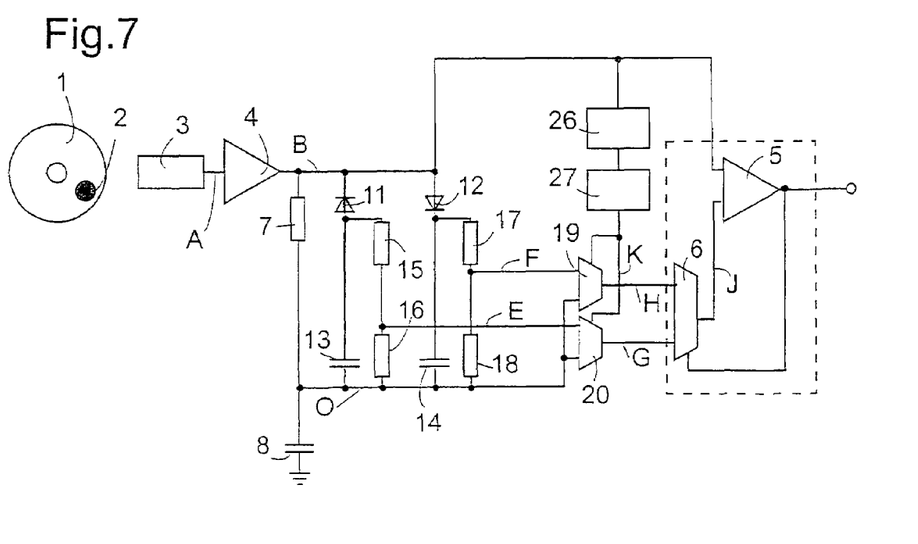
FIG. 7 is a block diagram illustration of a fifth embodiment of an angular position sensing device.

Another circuit variant with which an angular position of the emitter wheel 1 corresponding to a zero passage of the signal B has been detected relatively exactly is illustrated in FIG. 7. In this case the comparators 24, 25 and the flip flop 22 are replaced by a differentiation element 26, which computes the derivative of the signal B with respect to time dB/dt, and a trigger circuit 27.

Figure 8:
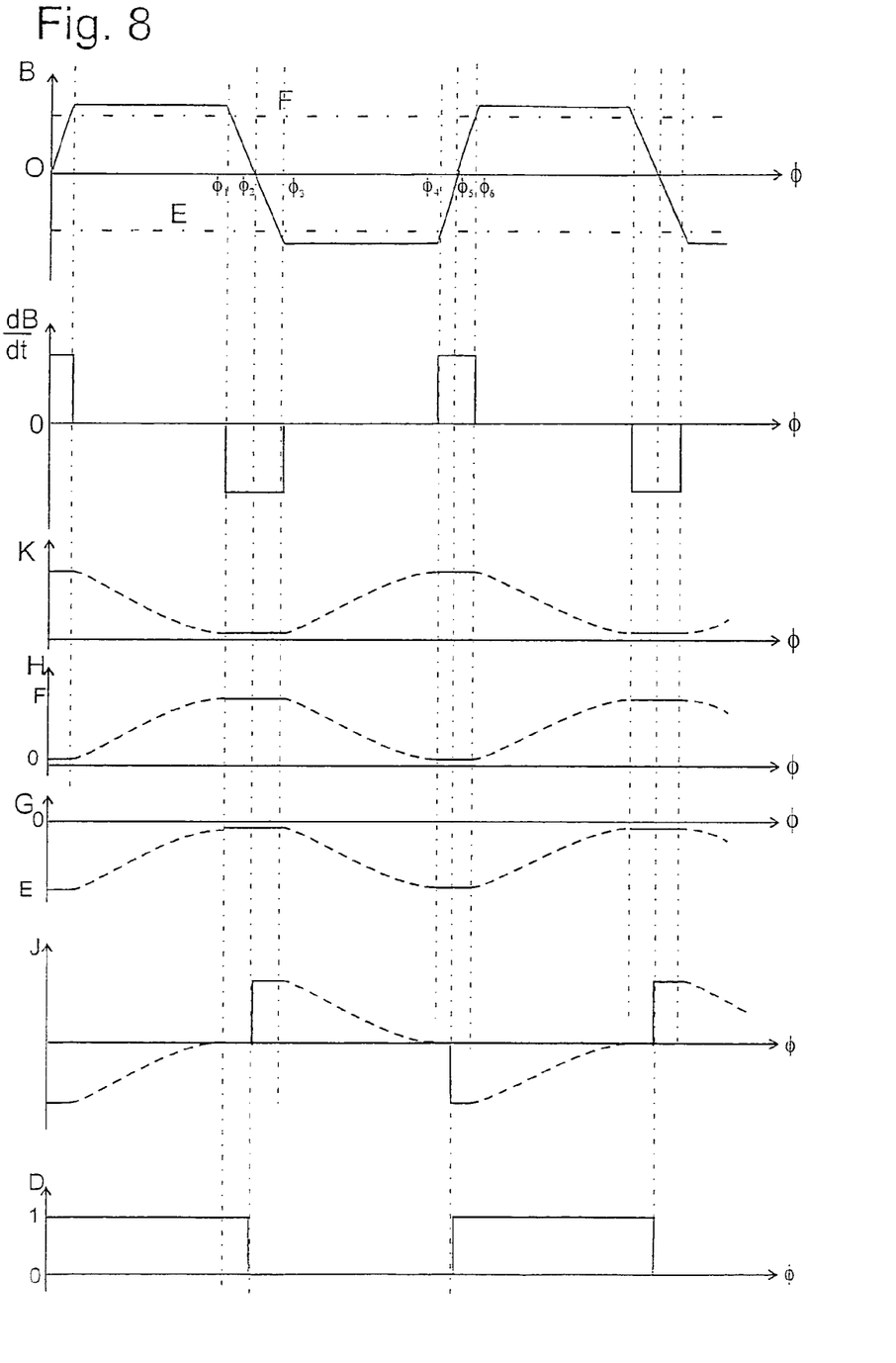
FIG. 8 is a graph of various signals as a function of angular position at various locations in the sensing device illustrated in FIG. 7.

Curves of signals in the circuit of FIG. 7 are illustrated in the graph of FIG. 8. With the temporarily saturated curve of the signal B assumed in the present description as an example, the curve for dB/dt illustrated in FIG. 8 is obtained, with alternating positive and negative intervals separated by intervals in which the derivative disappears. The trigger circuit 27 forms therefrom the signal K controlling the switches 19, 20, which assumes the value of zero or one in each angular interval in which the amplifier 4 is not saturated, depending on the algebraic sign of the derivative B, and in principle can assume arbitrary values in the intermediate intervals, since these intervals are of no significance for the operating method of the circuit.

The shape of the switch signal K results in the levels E or zero, or zero or F, respectively, illustrated in FIG. 8 as solid lines, for the output signals H, G of the switches 19, 20 when the amplifier 4 is not saturated. As with the configuration of FIG. 5, the signal G with zero level is applied at first as signal J to the input of the comparator 5 during a falling flank of signal B in the angular interval [$\phi_1$, $\phi_3$]; upon zero passage at $\phi_2$ there is a switch to signal H with level F. During the negative half-wave of signal B, the signal H and with it the signal J goes to zero, so that when the rising flank of the signal B goes through zero at the angular position $\phi_5$, the zero level is again applied to the comparator 5 as the comparison level.

Although the present invention has been shown and described with respect to several preferred embodiments thereof, various changes, omissions and additions to the form and detail thereof, may be made therein, without departing from the spirit and scope of the invention.

What is claimed is:

1. A device for detecting an angular position of a rotating object, comprising:
    a sensor that produces a sensor output signal indicative of the angular position of the rotating object;
    an amplitude detection circuit, that receives the sensor output signal, and generates a trip threshold related to the angular position of the rotating object and having an amplitude derived from the level of the sensor output signal; and
    an evaluation circuit that receives the sensor output signal and the trip threshold and provides a detection signal when the level of the sensor output signal crosses the trip threshold.

2. The device of claim 1, where the sensor output signal varies sinusoidally with the angular position of the object.

3. The device of claim 1, where the trip threshold comprises a mean value of the sensor output signal.

4. The device of claim 1, further comprising an averaging circuit having an input which receives the sensor output signal and an output which provides a signal representative of a mean value of the sensor output signal.

5. The device of claim 1, where the trip threshold comprises a reference level, where the evaluation circuit provides the detection signal when the level of the sensor output signal crosses the reference level from above and does not provide the detection signal when the level of the detection signal crosses the reference level from below.

6. The device of claim 1, where the trip threshold comprises a reference level, where the evaluation circuit provides the detection signal when the level of the sensor output signal crosses the reference level from below and does not provide the detection signal when the level of the sensor output signal crosses the second reference level from above.

7. The device of claim 1, where the trip threshold comprises first and second reference levels, where the evaluation circuit provides the detection signal when the level of the sensor output signal crosses the first reference level from above and where the evaluation circuit provides the detection signal when the level of the sensor output signal crosses the second reference level from below, and where the second reference level is greater than the first reference level.

8. The device of claim 1, where the evaluation circuit comprises:
    a comparator having a first input which receives the sensor output signal and a second input which receives a reference signal that includes the first and second reference levels, where the comparator provides the detection signal at an output when the levels of the signals at the two inputs of the comparator cross one another; and
    a selection circuit that selectively provides one of the first reference level and the second reference level to the second input of the comparator.

9. The device of claim 8, where the first and second reference levels lie on opposite sides of a mean value of the sensor output signal.

10. The device of claim 8, where the first and second reference levels are variable between a central level and one of two levels each spaced upward or downward, respectively, from the central level, where the first reference level is at the central level when the sensor output signal crosses the first reference level from above, and where the second reference level is at the central level when the sensor output signal crosses the second reference level from below.

11. The device of claim 1, further comprising a circuit that differentiates a change in the level of the sensor output signal.

12. The device of claim 10, where the selection circuit comprises a second comparator and a switch controlled by the second comparator, where the sensor output signal is applied to a first input of the second comparator and where the one of the first and second reference levels that is not applied at the same time to the first comparator is applied to a second input of the second comparator, and where the second comparator controls the switch when the levels of the signals at the inputs of the second comparator cross one another.

13. The device of claim 1, where the evaluation circuit produces a change in a magnitude of the detection signal when the level of the sensor output signal crosses the trip threshold.

14. The device of claim 1, further comprising means for deriving a pair of reference levels from an amplitude detected by the amplitude detection circuit.

15. The device of claim 1, further comprising means for deriving a pair of spaced levels from an amplitude detected by the amplitude detection circuit.

16. A method for determining an angular position of a rotating object, comprising the steps of:
    sensing the angular position of the object and providing a sensor output signal dependent on the angular position of the object;
    utilizing the sensor output signal to generate a trip threshold related to the angular position of the rotating object and having an amplitude derived from the sensor output signal; and determining that the object has reached a predetermined angular position when the level of the sensor output signal crosses the trip threshold and providing a detection signal indicative thereof.

17. The method of claim 16, where the sensor output signal varies sinusoidally with the angular position of the object.

18. The method of claim 16, where the trip threshold comprises a mean value of the sensor output signal.

19. The method of claim 16, where the trip threshold is defined by first and second reference levels, and where the method further comprises the step of determining that the object has reached a first predetermined angular position when the level of the sensor output signal crosses the first reference level from above.

20. The method of claim 16, where the trip threshold is defined by first and second reference levels, and where the method further comprises the step of determining that the object has reached a second predetermined angular position when the level of the sensor output signal crosses the second reference level from below.

21. The method of claim 16, where the trip threshold is defined by first and second reference levels, the second reference level being greater than the first reference level, and where the method further comprises the steps of:

determining that the object has reached a first predetermined angular position when the level of the sensor output signal crosses the first reference level from above, and determining that the object has reached a second predetermined angular position when the level of the sensor output signal crosses the second reference level from below.

22. The method of claim 21, where the first and second reference levels are disposed on opposite sides of a mean value of the sensor output signal.

23. The method of claim 16, further comprising the steps of:

measuring the amplitude of the sensor output signal; and determining a difference between a pair of reference levels as a function of the measured amplitude.

24. The method of claim 16, where the trip threshold is defined by first and second reference levels, and where the method further comprises the step of changing the first and second reference levels between a central level and one of first and second reference levels spaced upward or downward, respectively, from the central level, where the first reference level is changed to equal the central level after the sensor output signal has crossed the second reference level from below, and where the second reference level is changed to equal the central level after the sensor output signal has crossed the first reference level from above.

25. The method of claim 16, further comprising the steps of:

measuring the amplitude of the sensor output signal; and determining a difference between a pair of spaced levels as a function of the measured amplitude.

* * * * *